United States Patent [19]

Winsor

[11] Patent Number: 4,897,955
[45] Date of Patent: Feb. 6, 1990

[54] WOODEN LANDSCAPING STRUCTURES

[76] Inventor: Gerald K. Winsor, 30 Cranberry Crescent, Kemptville, Ontario, Canada K0G 1J0

[21] Appl. No.: 286,237

[22] Filed: Dec. 19, 1988

Related U.S. Application Data

[63] Continuation-in-part of Ser. No. 157,496, Feb. 12, 1988, abandoned.

[30] Foreign Application Priority Data

Feb. 16, 1987 [CA] Canada ................................. 529787

[51] Int. Cl.$^4$ ............................ A01B 1/08; E04B 1/00
[52] U.S. Cl. .......................................... 47/33; 52/585; 52/233; 217/65
[58] Field of Search ................... 47/33, 23, 24, 25, 85, 47/86; 52/233, 585; 217/17, 36, 65; 144/12; 403/292, 293; 405/288, 273, 258, 284

[56] References Cited

U.S. PATENT DOCUMENTS

| 1,219,786 | 3/1917 | Splater | 52/585 |
|---|---|---|---|
| 1,809,508 | 6/1931 | Colby | 52/585 X |
| 2,951,606 | 9/1960 | Benson | 217/65 |
| 3,545,128 | 10/1968 | Fontaine | 52/585 X |
| 4,152,185 | 5/1979 | Tessenske | 156/293 |
| 4,353,191 | 10/1982 | Schilbe | 52/233 |
| 4,391,077 | 7/1983 | Giess | 52/585 |

FOREIGN PATENT DOCUMENTS

| 2836701 | 2/1980 | Fed. Rep. of Germany | 52/233 |
|---|---|---|---|
| 2389725 | 1/1979 | France | 52/233 |

OTHER PUBLICATIONS

Hechinger Advertisement, Washington Post, Aug. 1988.

Primary Examiner—Randolph A. Reese
Assistant Examiner—Jeffrey L. Thompson
Attorney, Agent, or Firm—Ridout & Maybee

[57] ABSTRACT a landscaping structure and kit for constructing the same comprises pieces of timber having similar square cross sectional dimensions which are arranged in at least one geometrical shape having at least two rounds of timbers. Overlapping timbers form corner joints which are secured by hardwood dowels.

10 Claims, 2 Drawing Sheets

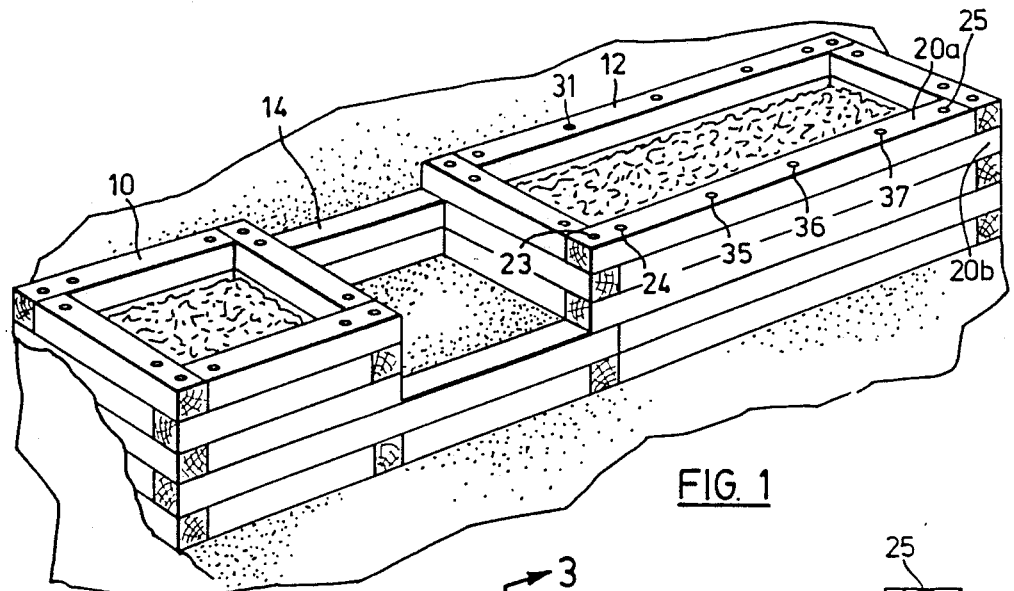
FIG. 1
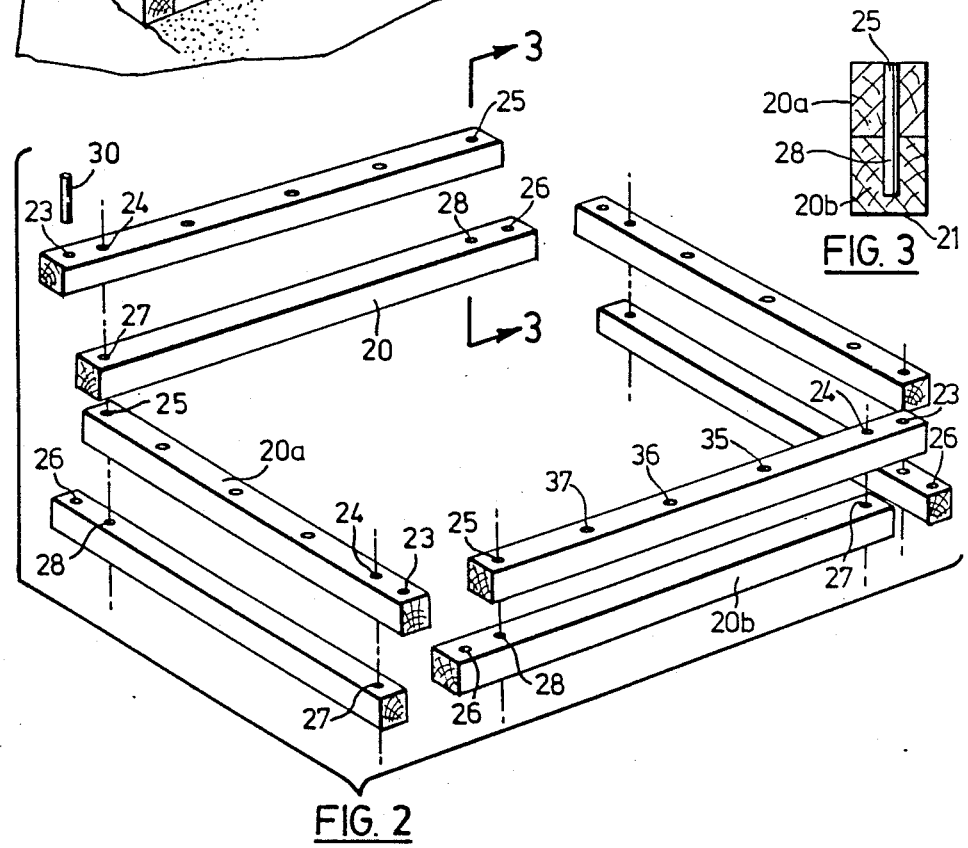
FIG. 2
FIG. 3

WOODEN LANDSCAPING STRUCTURES

This application is a continuation-in-part of my U.S. Ser. No. 157,496, filed Feb. 12, 1988 now abandoned, and entitled Wooden Landscaping Structures.

This invention is a structure for use in landscaping applications such as planter boxes, patios, walkways and driveways and a kit for constructing the same. The invention provides wooden containers for earth, gravel, patio stones or bricks. The containers are easily assembled from stacked modules formed of squared timbers which are pre-drilled to allow the construction of overlapping joints at corners which are secured with hardwood dowels. The abutting pre-drilled timbers of the overlying modules are also secured with hardwood dowels along their lengths. The structure of the invention is very strong and may also be used for retaining walls, decks, docks and building foundations.

The use of squared timbers to make containers or other structures for landscaping applications has become increasingly popular in recent years. These structures are presently made by driving large steel spikes through the timbers to hold them together. As these spiked structures age, expansion and contraction due to seasonal temperature changes cause the spikes to become loosened. A spiked structure may be deformed by an impact or through frost heaving of the underlying ground with the spikes holding the structure together being bent.

The present invention provides a structure of squared timbers which are held together with hardwood dowels. The alternating use of doweled overlapping joints at the corners of modules and the reinforcing provided by fastening adjacent modules of the structures according to this invention with dowels along the lengths of the timbers, provide significant advantages over the presently used spiked structures. Hardwood dowels swell with moisture to form a tight fit in the overlapping and overlying joints of these structures. The joints constructed in accordance with the invention are extremely strong, causing the structures of the invention to retain their shapes for the lifetime of the timbers used to make them even under conditions of heavy seasonal frost. The corner joints of the modules made in accordance with the invention are stronger than the timbers themselves, and thus, are resistant to impact. The joints between the modules alternated with the strong corner joints, are also able to withstand considerable pressure. A car or truck accidentally striking a structure of the invention with a force insufficient to break it will not cause it to deform.

SUMMARY OF THE INVENTION

The invention provides a landscaping structure which comprises stacked modules, each module having top and bottom pieces of squared timber joined at overlapping corners. A number of the bottom timbers are arranged in a first layer as desired forming at least one geometrical shape. A number of the top timbers are arranged overlying the first layer with overlapping timbers at each corner. Each piece of timber has two spaced parallel corner holes provided near a first end and one corner hole parallel to the others provided transversely near a second end. The corner holes of the bottom timbers are blind (i.e. do not extend completely through the timber) and preferably extend only partially, about ⅔ of the way through the timber, while the corner holes of the top timbers extend completely through the timber. The corner holes are spaced so that vertical alignment of corner holes between stacked timbers is obtained at the corners formed by overlapping timbers. Each piece of timber is provided with one or more intermediate joiner holes parallel to the corner holes, which are preferably also blind, extending only partially through the timber. In the bottom timbers, the blind intermediate joiner holes are formed in a face of the timber opposite to the blind corner holes. The intermediate joiner holes are spaced to align between overlying timbers of adjacent modules so that additional rounds of timber and whole modules may be added as desired. Hardwood dowels are snugly fitted through the aligned corner and intermediate joiner holes of overlapping timbers so that an overlying top timber is joined to two underlying bottom timbers at each corner of a module, and an overlying bottom timber of one module is joined to an underlying top timber of another module, in order to form a multi-level structure.

BRIEF DESCRIPTION OF THE DRAWINGS

FIG. 1 is a perspective view of a landscaping structure of the invention;

FIG. 2 is an exploded perspective view showing the construction of a module used in constructing a structure of the invention;

FIG. 3 is a sectional view at line 3—3 of FIG. 2;

Typical landscaping structures made according to this invention are shown in FIG. 1. A square planter box 10 is joined to a rectangular planter box 12 by a stepped patio structure 14. The modular design of these structures allows one to add to existing structures as landscaping plans evolve.

Figure 4:
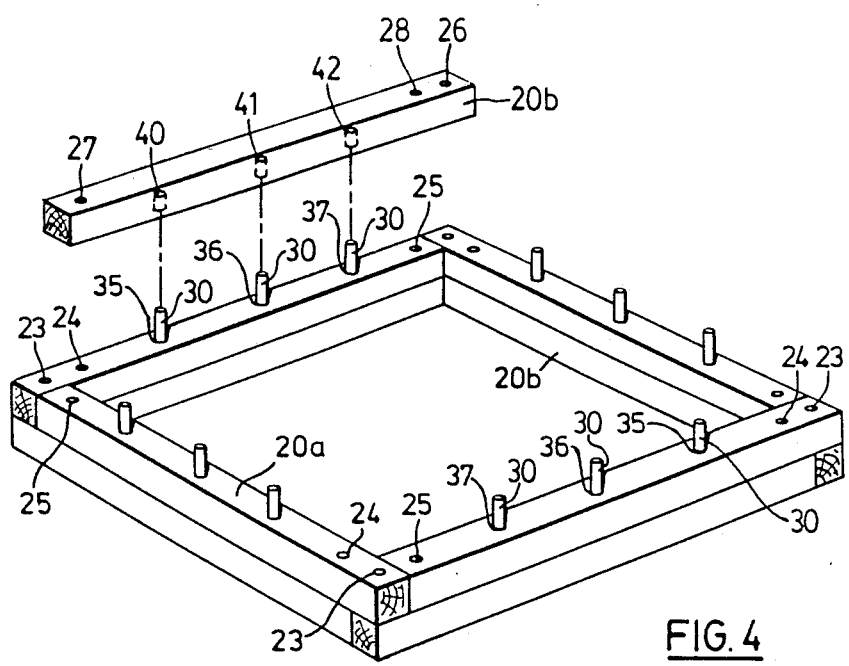
FIG. 4 is a perspective view of the assembled module of FIG. 2, showing in exploded perspective, the method of construction of stacked modules.

The structures of the invention are assembled from a stacked series of modules of the type shown in FIG. 4. As shown in FIG. 2, each module is assembled from pieces of preferably squared timber, such as 4×4's, generally designated by reference numeral 20. The top timbers 20a are drilled to provide two spaced parallel corner holes 23 and 24 near one end and a third parallel corner hole 25 near the other end. The holes 23, 24 and 25 pass transversely through the timber and are preferably centered on the surfaces through which they pass. Similarly, the bottom timbers 20b are drilled to provide two spaced parallel blind corner holes 26 and 28 near one end and a third parallel blind corner holes 27 near the other end. As shown in FIG. 3, the blind holes 26, 27 and 28 pass transversely only about ⅔ of the way through the timber and are preferably centered on the surface in which they are formed. Thus, on a typical 4×4 timber measuring 3.5 inches square, one inch diameter corner holes 23-25 and 26-28 are centered 1.75 inches from either longitudinal edge of the piece of timber 20. The spacing of the blind holes 26-28 along the length of the bottom timber 20b is critical to ensure alignment of the holes 23-25 in the overlapping top timbers 20a forming a module of the invention. Thus, in the embodiment shown in FIGS. 2-4 using 4×4 timbers 20a and 20b (each measuring 3.5 inches square), the holes 23 and 25 and 26 and 27 are each centered 1.75 inches in from each end of the timbers 20a and 20b and the holes 24 and 28 are each centered 5.25 inches in from the end or 3.5 inches from the holes 23 and 26, respectively. Also, blind corner holes 26–28 in the bottom timbers 20b would preferably be drilled 2–2.5 inches deep.

As shown in FIG. 2, pieces of top timber 20a having holes 23–25 spaced as described can be assembled with pieces of bottom timber 20b of equal dimensions and having holes 26–28 spaced as described, into a square module having top timbers 20a overlapping bottom timbers 20b at each corner. At each corner the hole 23 of top timber 20a aligns with the blind hole 26 of a perpendicularly oriented bottom timber 20b, and the holes 24 and 25 of a top timber 20a respectively align, with the holes 27 and 28 of an underlying bottom timber 20b. Hardwood dowels 30 of an appropriate length are inserted into the aligned holes to attach top and bottom timbers 20a and 20b to one another through holes 24, 25, 27 and 28, and to create overlapping joints at each corner through holes 23 and 26. The assembled module structure is shown in FIG. 4.

Joints for the structures of the invention are very strong and will not loosen with age. This is because the hardwood dowels so used to form the joints swell with the addition of moisture to become locked within the timbers 20a and 20b. Independent engineering tests of a module made of 4×4 timber as described showed that the corner joints could withstand a shear force of 25 tons applied by a hydraulic press. Because the dowels 30 are stronger than the timbers 20a and 20b, structural failure would occur first in the timbers 20a and 20b.

In order to construct multi-level structures, such as that illustrated in FIG. 1, the modules may be securely stacked in the manner hereinafter described.

Figure 5:
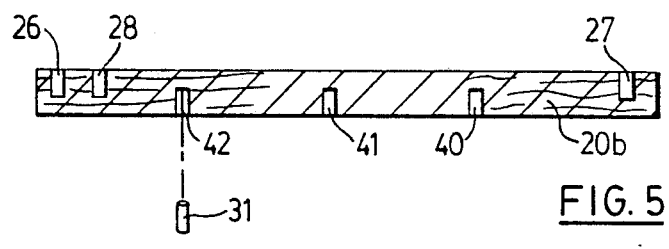
FIG. 5 is a sectional view of a bottom timber, according to the invention.
Figure 6:
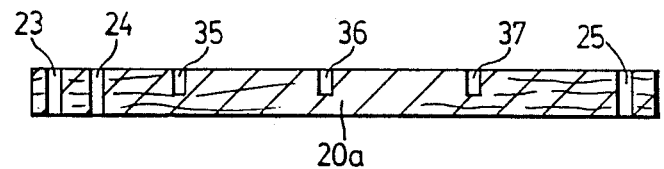
FIG. 6 is a sectional view of a top timber, according to the invention.

As shown in FIGS. 5 and 6, joiner holes 35, 36 and 37 are provided through one surface of each top timber 20a between corner holes 24 and 25, and holes 40, 41 and 42 are provided through the bottom surface of each bottom timber 20b between corner holes 27 and 28 formed in the opposite top surface of the bottom timber. Preferably these intermediate joiner holes pass only partially through each timber, about ⅔ of the way through, the same as the blind corner holes 26–28 in the bottom timbers 20b. On constructing a single module, as described above and shown in FIG. 2, the foundation layer of the bottom timbers 20b arranged in the selected geometric pattern, should be placed with the surface having the series of joiner holes 40–42 formed in it facing downwardly and the opposed surface having the corner holes 26–28 formed in it facing upwardly. The complementary layer of top timbers 20a is then placed on top, forming overlapping corners as previously described, with the surface of the top timbers 20a having the series of joiner holes 35–37 formed in it facing upwardly. Dowels 30 may then be inserted through the corner holes 23–25 into the corner holes 26–28 of the underlying bottom timbers 20b to complete construction of a single module according to the invention. As shown in FIG. 4, dowels 30 may then be inserted into each of the joiner holes 35–37 of the top timbers 20a, and left protruding as shown in FIG. 4. To begin construction of the next module on top of the first, bottom timbers 20b are first placed over the top timbers 20a of the previous module, fitting the dowels 30 protruding from the joiner holes 35–37 of the previous top timber 20a into the complementarily spaced joiner holes 40–42 of the overlying bottom timber 20b and forming overlapping corners. A second module may then be constructed, secured at the overlapping corners of the top and bottom timbers. The stacked modules are oriented so that the completed structure has alternating overlapping corners. This has esthetic appeal as well as simplifying construction of the timbers of the kit by permitting use of similar spacing of the holes on top and bottom timbers.

In order to ensure that the modules may be constructed in stacked formation, it is important to ensure that the joiner holes of the top and bottom timbers are spaced to align when stacked in facing arrangement. This alignment is accomplished by making the distance between holes 24 and 35 equal the distance between holes 25 and 37, while the distance between holes 35 and 36 is equal to the distance between holes 36 and 37. For example, on a standard 4×4 timber measuring 3.5 inches square and 92.5 inches in length, joiner holes may be spaced at even one-foot intervals beginning at the first end of the timber. On a top timber 20a the first joiner hole 35 is thus spaced 6.75 inches from hole 24, and on a bottom timber 20b, hole 42 is spaced 6.75 inches from hole 28. The last joiner hole 37 in the series on a top timber 20a, is spaced 8.5 inches from the second end of the timber or 6.75 inches from hole 25, and the joiner hole 40, on a bottom timber 20b is spaced 6.75 inches from the hole 27. Thus, modular spacing of the joiner holes ensures alignment.

It has been found to be preferable to provide the ground engaging round of bottom timbers 20b with the solid bottom surface under the corner holes 26–28 shown in FIG. 3 at 21. This arrangement allows the bottom surface 21 to be sealed by an appropriate sealant against the degrading effects of ground contact. If preferred, the intermediate joiner holes 40–42 formed in the ground engaging surface of the bottom round of bottom timbers 20b may be plugged with shortened dowels 31 and also sealed with an appropriate sealant. Similarly, for esthetic appeal, these same shortened dowels 31 can be used to camouflage the unused intermediate joiner holes 35–37 along the upper surface of the top round of top timbers 20a of a structure as shown in FIG. 1.

Because of their inherent strength, the structures of the invention may be made quite large. Large structures of the invention are usually used to create patios, walkways or driveways, and as such are usually just two rounds of timbers 20 high. It has been found that due to the strength of these structures, they make ideal containers for interlocking bricked areas. The stability afforded by the structure of the invention prevents the interlocking bricks from buckling due to frost heave, the entire structure being responsive to minor shifting of the underlying ground, thereby maintaining the relative integrity of the unit as a whole.

The foregoing description has related to rectangular shaped structures of the invention. The skilled person will appreciate that the invention may be used to make a structure of any straight sided geometrical shape, the ends of the timbers 20 being angled appropriately and both the corner holes 23–25 and 26–28, and the joiner holes 35–37 and 40–42, being spaced as required to achieve the desired shape. Likewise, it should be clear that the length of dowels 30 used is whatever may be appropriate for the particular structure being made, each timber 20 in a stack forming a wall of the structure being doweled to the timber below and above it.

I claim:

1. A landscaping structure, comprising:

at least two stacked modules, each module having top and bottom timbers joined at overlapping corners, a plurality of the bottom timbers being arranged in a first layer forming at least one straight-sided geometrical shape, a second layer of a plurality of the top timbers overlying the first layer with overlapping timbers at each corner of the shape, each bottom timber having two spaced parallel blind corner holes provided transversely near a first end and one blind corner hole parallel to the other two blind corner holes provided near a second end, each top timber having two spaced parallel corner holes provided transversely through the top timber near a first end and one corner hole parallel to the other two corner holes provided transversely through the top timber near a second end, the corner holes and blind corner holes being spaced so that alignment of corner holes with blind corner holes is obtained between top and bottom timbers overlapping at the corners, each timber having at least one intermediate joiner hole provided parallel to said corner hole or blind corner hole spaced from the first and second ends of the timber so that alignment of intermediate joiner holes is obtained between the overlying adjoining bottom and top timbers of stacked modules; and hardwood dowels being snugly fitted through the aligned corners and intermediate joiner holes of overlapping timbers and stacked modules so that an overlying top timber is joined to two underlying bottom timbers at each corner of a module, and an overlying bottom timber of one module is joined to an underlying top timber of another module, thereby to form a structure.

2. A structure as claimed in claim 1, wherein each timber has a plurality of longitudinally, equally-spaced intermediate joiner holes.

3. A structure as claimed in claim 1, wherein the blind corner holes in each bottom timber extend about ⅝ of the way through said bottom timber.

4. A structure, as claimed in claim 1, wherein each module is oriented so that adjoining timbers of stacked modules have overlapping corners.

5. A structure as claimed in claim 1, wherein said at least one intermediate joiner hole is a blind hole, and wherein each of the bottom timbers has said at least one joiner hole defined in a face of the bottom timber opposite to the blind corner holes.

6. A structure as claimed in claim 5, wherein said at least one intermediate joiner hole extends about ⅝ of the way through each timber.

7. A kit for constructing landscaping structures comprising:

a plurality of top and bottom timbers, each bottom timber having two spaced parallel blind corner holes provided transversely near a first end and one blind corner hole parallel to the other two blind corner holes provided near a second end, each top timber having two spaced parallel corner holes provided transversely through the top timber near a first end and one corner hole parallel to the other two corner holes provided transversely through the top timber near a second end, the corner holes of the top timbers being spaced to align with blind corner holes of bottom timbers at overlapping corners when a plurality of the top timbers are arranged to overlay a geometrically-arranged layer of a plurality of the bottom timbers, each timber having at least one intermediate joiner hole provided parallel to said corner holes and blind corner holes spaced from the first and second ends of the timber for alignment with said at least one joiner hole of an overlying timber when a plurality of the bottom timbers are arranged to overlay, with overlapping corners, a geometrically-arranged layer of a plurality of the top timbers; and a plurality of hardwood dowels adapted to be snugly fitted through the aligned corner and blind corner holes, and into intermediate joiner holes of overlying timbers.

8. A kit as claimed in claim 7, wherein said at least one intermediate joiner hole is a blind hole, and wherein each of the bottom timbers has said at leas one joiner hole defined in an opposite face of the bottom timber to the blind corner holes.

9. A module for a landscaping structure, comprising:

a plurality of bottom timbers, arranged in a first layer forming at least one straight-sided geometrical shape having corners, each said bottom timber having an upper face with two spaced parallel blind corner holes provided transversely near a first end and one blind corner hole, parallel to the other two blind corner holes, provided near a second end, and at least one intermediate joiner hole provided parallel to said blind corner holes;

a plurality of top timbers overlying the bottom timbers in a second layer of said at least one straight-sided geometrical shape, with overlapping top and bottom timbers at each corner of the shape, each said top piece having two spaced parallel corner holes provided transversely through the top timber near a first end and one corner hole, parallel to the other two corner holes, provided transversely through the top timber near a second end, the corner holes of the top timbers being spaced to align with the blind corner holes of adjoining underlying bottom timbers at overlapping corners, each top timber having at least one intermediate joining hole provided parallel to said corner holes spaced from the first and second ends of the top timber to align with said at least one intermediate joiner hole of an adjoining overlying bottom piece of an overlying module; and a plurality of hardwood dowels being snugly inserted into the aligned corner holes and blind corner holes of adjoining top and bottom timbers for joining said timbers together at overlapping corners, said dowels being adapted to be snugly inserted into intermediate joiner holes of top and bottom timbers.

10. A module as claimed in claim 9, wherein said at least one intermediate joiner hole in each of said top and bottom timbers is a blind hole, and wherein in each of the bottom timbers, said at least one joiner hole is formed in an opposite face to the upper face of the bottom timber.

* * * * *